US010706292B2

(12) United States Patent
Yokota et al.

(10) Patent No.: US 10,706,292 B2
(45) Date of Patent: Jul. 7, 2020

(54) INFORMATION PROCESSING APPARATUS AND PROGRAM

(71) Applicant: DENSO CORPORATION, Kariya, Aichi-pref. (JP)

(72) Inventors: Nobuyuki Yokota, Kariya (JP); Hirohiko Yanagawa, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 97 days.

(21) Appl. No.: 16/082,395

(22) PCT Filed: Mar. 6, 2017

(86) PCT No.: PCT/JP2017/008771
§ 371 (c)(1),
(2) Date: Sep. 5, 2018

(87) PCT Pub. No.: WO2017/154833
PCT Pub. Date: Sep. 14, 2017

(65) Prior Publication Data
US 2019/0087665 A1 Mar. 21, 2019

(30) Foreign Application Priority Data
Mar. 7, 2016 (JP) .................................. 2016-043469

(51) Int. Cl.
*G06K 9/00* (2006.01)
*B60R 1/00* (2006.01)
(Continued)

(52) U.S. Cl.
CPC ............ *G06K 9/00791* (2013.01); *B60R 1/00* (2013.01); *B60W 40/105* (2013.01); *G06T 15/20* (2013.01);
(Continued)

(58) Field of Classification Search
CPC ............................... B60K 31/0008; B60K 17/34; B60K 31/0066; B60W 30/16; B60W 30/09
See application file for complete search history.

(56) References Cited

U.S. PATENT DOCUMENTS 7,307,655 B1 12/2007 Okamoto et al.
8,228,379 B2 * 7/2012 Kallhammer ............. B60R 1/00
348/148
(Continued)

FOREIGN PATENT DOCUMENTS

| JP | 2002-109697 A | 4/2001 |
|---|---|---|
| JP | 3286306 A | 5/2002 |
| JP | 2011-004201 A | 1/2011 |

*Primary Examiner* — Yosef Kassa
(74) *Attorney, Agent, or Firm* — Maschoff Brennan

(57) ABSTRACT

An information processing apparatus includes a status determining unit, a speed detecting unit, and a display controlling unit. The status determining unit determines a control status of control performed by an output control apparatus controlling an output direction of a driving force for a vehicle. The speed detecting unit detects a traveling speed of the vehicle. The display controlling unit allows a display apparatus to display one or more surrounding images included in a plurality of surrounding images and determined according to the control status determined by the status determining unit and the traveling speed detected by the speed detecting unit, the plurality of surrounding images being images which show surroundings of the vehicle based on images captured by one or more cameras capturing images of the surroundings of the vehicle and which differ from one another in at least one of a viewpoint and a display range.

12 Claims, 5 Drawing Sheets

(51) Int. Cl.
*H04N 7/18* (2006.01)
*B60W 40/105* (2012.01)
*G06T 15/20* (2011.01)

(52) U.S. Cl.
CPC .......... *H04N 7/18* (2013.01); *B60R 2300/105* (2013.01); *B60R 2300/802* (2013.01)

(56) References Cited

U.S. PATENT DOCUMENTS

| | | | | |
|---|---|---|---|---|
| 8,564,079 | B2 * | 10/2013 | Kang | H01L 43/08 |
| | | | | 257/421 |
| 8,564,657 | B2 * | 10/2013 | Michalke | G06T 7/251 |
| | | | | 348/116 |
| 8,665,079 | B2 * | 3/2014 | Pawlicki | B60Q 1/525 |
| | | | | 340/435 |
| 8,744,744 | B2 * | 6/2014 | Takagi | B60W 40/04 |
| | | | | 701/301 |
| 9,378,642 | B2 * | 6/2016 | Shida | B60K 31/0008 |

* cited by examiner

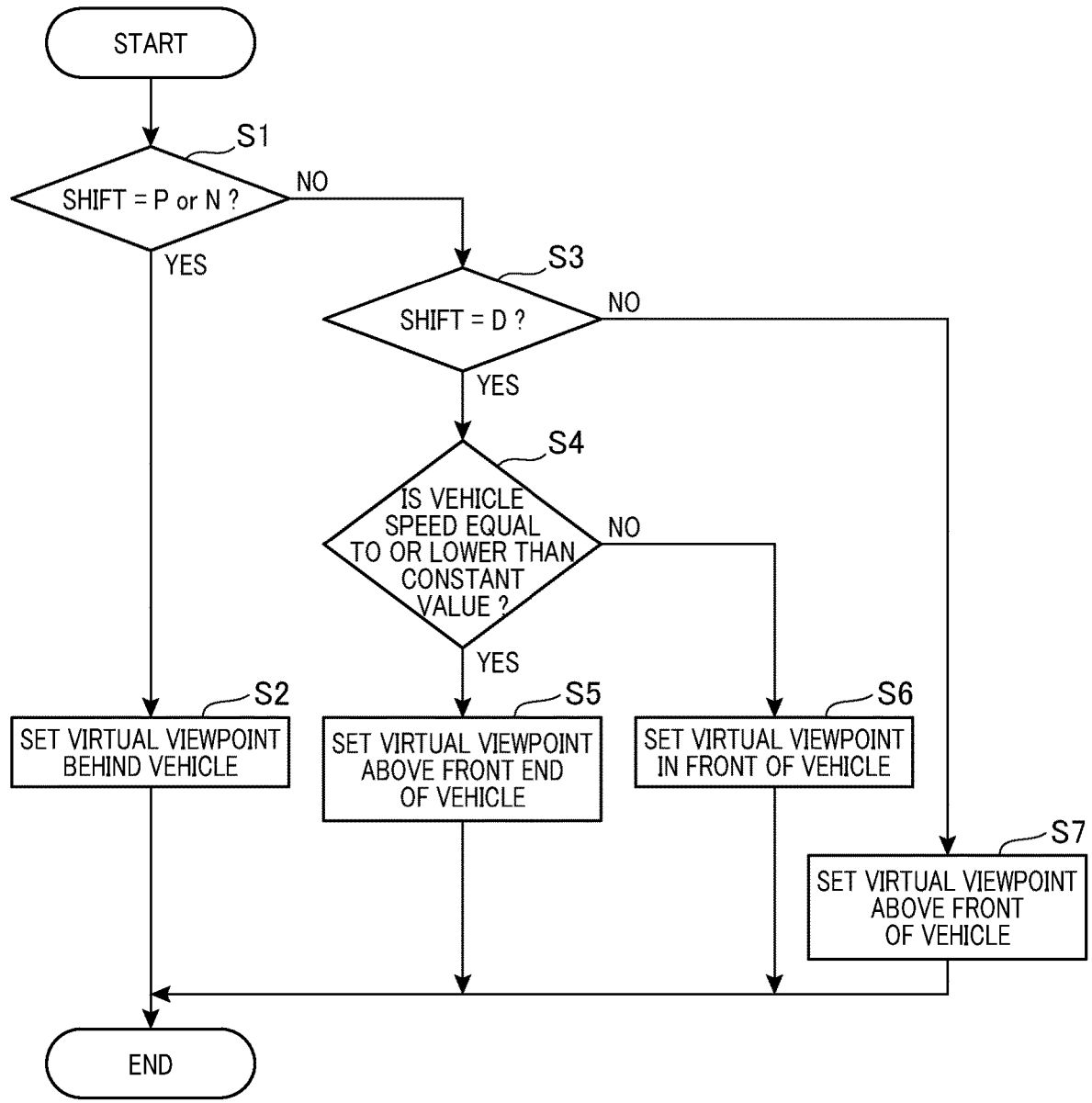

INFORMATION PROCESSING APPARATUS AND PROGRAM

TECHNICAL FIELD

This application is the U.S. national phase of International Application No. PCT/JP2017/008771 filed Mar. 6, 2017 which designated the U.S. and claims priority to Japanese Patent Application No. 2016-43469 filed Mar. 7, 2016, the contents of which are incorporated herein by reference.

BACKGROUND ART

The present disclosure relates to a technique for capturing an image of surroundings of a vehicle and displaying the image.

BACKGROUND ART

A technique for displaying an image of surroundings of a vehicle from a virtual viewpoint is known. For example, PTL 1 proposes a technique for displaying an image of the vehicle as viewed obliquely from above.

CITATION LIST

Patent Literature

PTL 1: JP 2000-563072 A

SUMMARY OF THE INVENTION

The inventors have found that the proposed technique poses a problem in that an area surrounding the vehicle which driver in the vehicle desires to view varies depending on a traveling status of the vehicle.

The present disclosure desirably provides a technique for displaying an image showing an appropriate range surrounding a vehicle.

A first aspect of the present disclosure is an information processing apparatus including a status determining unit, a speed detecting unit, and a display controlling unit.

The status determining unit is configured to determine a control status of control performed by a control unit controlling an output direction of a driving force exerted by a traveling driving source of a vehicle. The control unit is configured to control the output direction of the driving force exerted by the traveling driving source of the vehicle. The speed detecting unit is configured to detect a traveling speed of the vehicle. The display controlling unit is configured to allow a display apparatus to display one or more surrounding images included in a plurality of surrounding images. The plurality of surrounding images are images showing surroundings of the vehicle based on images captured by one or more cameras capturing images of the surroundings of the vehicle, and differ from one another in at least one of viewpoints and a display range.

The display controlling unit is configured to allow the display apparatus to display the surrounding image displaying an area visually recognized when looking downward from a viewpoint above a front end of the vehicle when the speed detected by the speed detecting unit is equal to or lower than a predetermined speed, and to display the surrounding image displaying areas located laterally to and behind the vehicle when the speed detected by the speed detecting unit exceeds the predetermined speed, in a case where the control status determined by the status determining unit indicates that a driving force is allowed to be transmitted in such a manner as to move the vehicle forward.

A second aspect of the present disclosure is an information processing apparatus including a status determining unit, a speed detecting unit, and a display controlling unit.

The status determining unit is configured to determine a control status of control performed by a control unit controlling an output direction of a driving force exerted by a traveling driving source of a vehicle. The control unit is configured to control the output direction of the driving force exerted by the traveling driving source of the vehicle. The speed detecting unit is configured to detect a traveling speed of the vehicle. The display controlling unit is configured to allow a display apparatus to display one or more surrounding images included in a plurality of surrounding images, the plurality of surrounding images being images which show surroundings of the vehicle based on images captured by one or more cameras capturing images of the surroundings of the vehicle and which differ from one another in at least one of a viewpoint and a display range.

The display controlling unit is configured to allow the display apparatus to display the surrounding image displaying an area corresponding to a road surface in front of the vehicle which is a blind spot of a driver of the vehicle when the speed detected by the speed detecting unit is equal to or lower than a predetermined speed, and to display the surrounding image displaying areas located laterally to and behind the vehicle when the speed detected by the speed detecting unit exceeds the predetermined speed, in a case where the control status determined by the status determining unit indicates that a driving force is allowed to be transmitted in such a manner as to move the vehicle forward.

Such a configuration allows the display apparatus to display surrounding images showing a range suitable for the traveling status of the vehicle based on the output direction of the driving force exerted by the traveling driving source of the vehicle and the traveling speed of the vehicle. Therefore, the driver in the vehicle can view images corresponding to the situation.

Note that the above-described output direction of the driving force is a direction in which the vehicle can be moved under the driving force exerted by the traveling driving source, and is either a forward direction or a backward direction.

A third aspect of the present disclosure is a program causing a computer to function as a status determining unit, a speed detecting unit, and a display controlling unit. Functions of the status determining unit, the speed detecting unit, and the display controlling unit are similar to those of the status determining unit, speed detecting unit, and display controlling unit provided in the information processing apparatus according to the above-described first aspect.

A fourth aspect of the present disclosure is a program causing a computer to function as a status determining unit, a speed detecting unit, and a display controlling unit. Functions of the status determining unit, the speed detecting unit, and the display controlling unit are similar to those of the status determining unit, speed detecting unit, and display controlling unit provided in the information processing apparatus according to the above-described second aspect.

Such a configuration allows the computer to fulfill functions similar to the functions of the information processing apparatus according to the above-described first aspect.

Reference signs in parentheses in the claims indicate correspondence with the specific means described in the following embodiments as a mode, and do not limit the technical scope of the present disclosure.

BRIEF DESCRIPTION OF THE DRAWINGS

FIG. 7 is a flowchart of image display processing.

DESCRIPTION OF THE EMBODIMENTS

With reference to the drawings, description will be given of an embodiment according to the present invention.

1. Embodiment

[1-1. Configuration]

Figure 1:
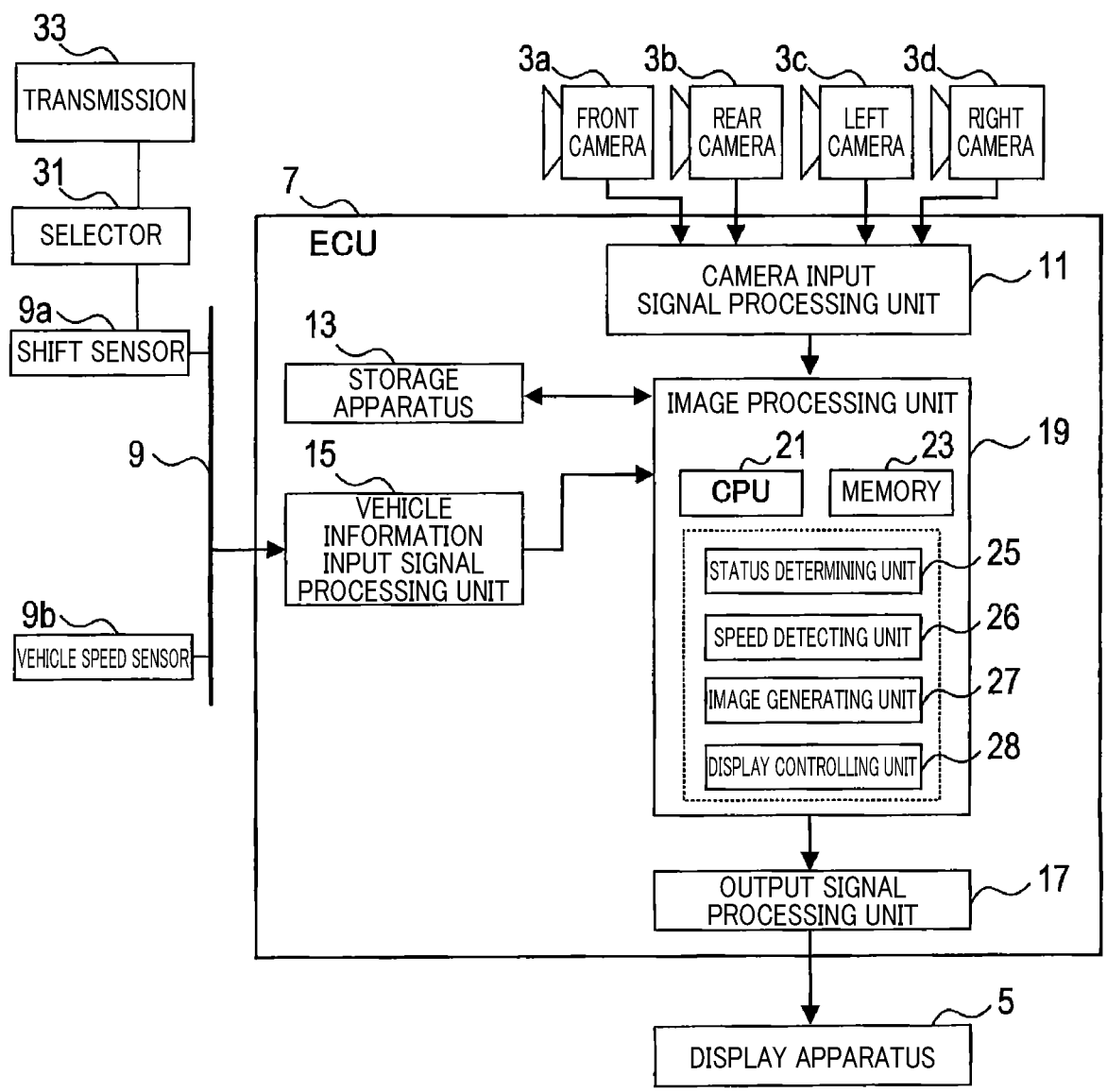
FIG. 1 is a block diagram illustrating a configuration of an image display system.

An image display system 1 is a system mounted on a vehicle such as an automobile. As illustrated in FIG. 1, the image display system 1 includes a front camera 3a, a rear camera 3b, a left camera 3c, a right camera 3d, a display apparatus 5, and an electronic control unit (hereinafter, referred to as an ECU) 7 which are mounted on the vehicle. In the description below, a camera 3 may include the four cameras 3a, 3b, 3c, 3d. The ECU 7 corresponds to an information processing apparatus.

The camera 3 is an imaging apparatus provided in the vehicle. The camera 3 may be, for example, a well-known CCD image sensor or CMOS image sensor. The cameras 3a, 3b, 3c, 3d capture images of the surroundings of the vehicle at predetermined time intervals (by way of example, at intervals of ⅟₁₅ s). The front camera 3a, the rear camera 3b, the left camera 3c, and the right camera 3d are arranged to capture images of the front, rear, left, and right, respectively, of the vehicle.

The display apparatus 5 is an apparatus having, for example, a liquid crystal display screen or an organic EL display screen on which images can be displayed. The display apparatus 5 displays an image in accordance with a signal received from the ECU 7.

The ECU 7 has a first input processing unit 11, a storage apparatus 13, a second input processing unit 15, an output signal processing unit 17, and an image processing unit 19.

The first input processing unit 11 converts an analog signal of a captured image received from the camera 3 into a digital signal and outputs the digital signal to the image processing unit 19.

The storage apparatus 13 is an apparatus constituting a storage area where information can be stored. Parameters such as positions and angles at which the respective cameras 3 are installed are stored in the storage area configured by the storage apparatus 13, and are read by the image processing unit 19 when needed.

The second input processing unit 15 is connected to an in-vehicle network 9. The second input processing unit 15 acquires signals outputted by a shift sensor 9a and a vehicle speed sensor 9b, connected to the in-vehicle network 9, and outputs the signals to the image processing unit 19.

The shift sensor 9a is a sensor which provides an output corresponding to a position to which a selector 31 provided near a driver's seat is operated and moved by the driver, in other words, an output corresponding to a shift range set by the driver operating the selector. In the present embodiment, a transmission 33 of the vehicle may be of an automatic type.

The selector 31 is an operation component such as a lever which is used to operate the transmission 33 of the vehicle. By operating the selector 31, the driver can set the shift range to any one of a parking range (hereinafter, referred to as a P range), a reverse range (hereinafter, referred to as an R range), a neutral range (hereinafter, referred to as an N range), and a drive range (hereinafter, referred to as a D range). The transmission 33 corresponds to an output control apparatus.

The vehicle speed sensor 9b is a sensor which outputs a signal corresponding to a traveling speed of the vehicle.

The output signal processing unit 17 converts a digital signal of image data outputted from the image processing unit 19 into an analog signal and outputs the analog signal to the display apparatus 5. The display apparatus 5 displays an image based on the received signal.

The image processing unit 19 is mainly constituted of a well-known microcomputer having a CPU 21 and a semiconductor memory such as a RAM, a ROM, or a flash memory (hereinafter, referred to as a memory 23). Various functions of the image processing unit 19 are implemented by the CPU 21 a program stored in a non-transitory tangible storage medium. In the present example, the memory 23 corresponds to the non-transitory tangible storage medium in which the program is stored. Furthermore, execution of the program allows a method corresponding to the program to be performed. One or more microcomputers may constitute the image processing unit 19.

As a configuration for functions implemented by the CPU 21 executing the program, the image processing unit 19 includes a status determining unit 25, a speed detecting unit 26, an image generating unit 27, and a display controlling unit 28 as illustrated in FIG. 1. A technique for implementing these elements, constituting the image processing unit 19, is not limited to software. Some or all of the elements may be implemented using hardware including a combination of logic circuits, analog circuits, or the like.

The status determining unit 25 determines a control status of the transmission 33 based on a signal outputted from the shift sensor 9a.

The control status of the transmission 33 refers to the status of control of an output direction of a driving force exerted by an engine serving as a traveling driving source of the vehicle.

The output direction of the driving force is a direction in which the vehicle can be moved under the driving force of the engine, and is either a forward direction or a backward direction. The output direction does not mean the direction in which the vehicle is currently traveling. For example, even if the vehicle travels at a speed of 0 km/h, the output direction becomes forward if the state of the transmission 33 is in a state where the vehicle advances when the accelerator is depressed by the driver.

Furthermore, the control status of the transmission 33 can be roughly classified into three states: (i) a state where the transmission 33 transmits a driving force to move the vehicle forward, (ii) a state where the transmission 33 transmits no driving force, and (iii) a state where the transmission 33 transmits a driving force to move the vehicle backward. As a matter of course, a more detailed classification of the states indicated by the control status of the transmission 33 is possible. The control status of the transmission 33 changes according to the manner of connections among gears constituting the transmission 33.

Specifically, if the D range is set as the shift range, the control status of the transmission 33 is such that the transmission 33 transmits motive power to move the vehicle forward. If the P range or the N range is set as the shift range, the control status of the transmission 33 is such that the transmission 33 transmits no motive power. If the R range is set as the shift range, the control status of the transmission 33 is such that the transmission 33 transmits motive power to move the vehicle backward.

The speed detecting unit 26 detects the traveling speed of the vehicle based on a signal outputted from the vehicle speed sensor 9b.

Based on images captured by one or more of the cameras 3a, 3b, 3c, 3d, the image generating unit 27 generates one or more images from viewpoints different from those for the images captured by the respective cameras 3a, 3b, 3c, 3d. To generate the one or more images, parameters for the camera 3 stored in the storage apparatus 13 are used.

The display controlling unit 28 allows the display apparatus 5 to display surrounding images. The surrounding image will be described below.

[1-2. Surrounding Image]

The surrounding image is an image showing surroundings of the vehicle and is generated by the image generating unit 27 based on an image captured by the camera 3 which captures images of the surroundings of the vehicle. The image generating unit 27 generates images from viewpoints different from those of the four cameras 3 as described above. Each image generated by the image generating unit 27 is a surrounding image.

The viewpoint as used herein refers to as a position as a standing point when viewing a captured object. Since a well-known technique is used to generate images from viewpoints different from those for the captured images based on images captured from a plurality of different viewpoints, description of the technique is omitted.

Figure 2:
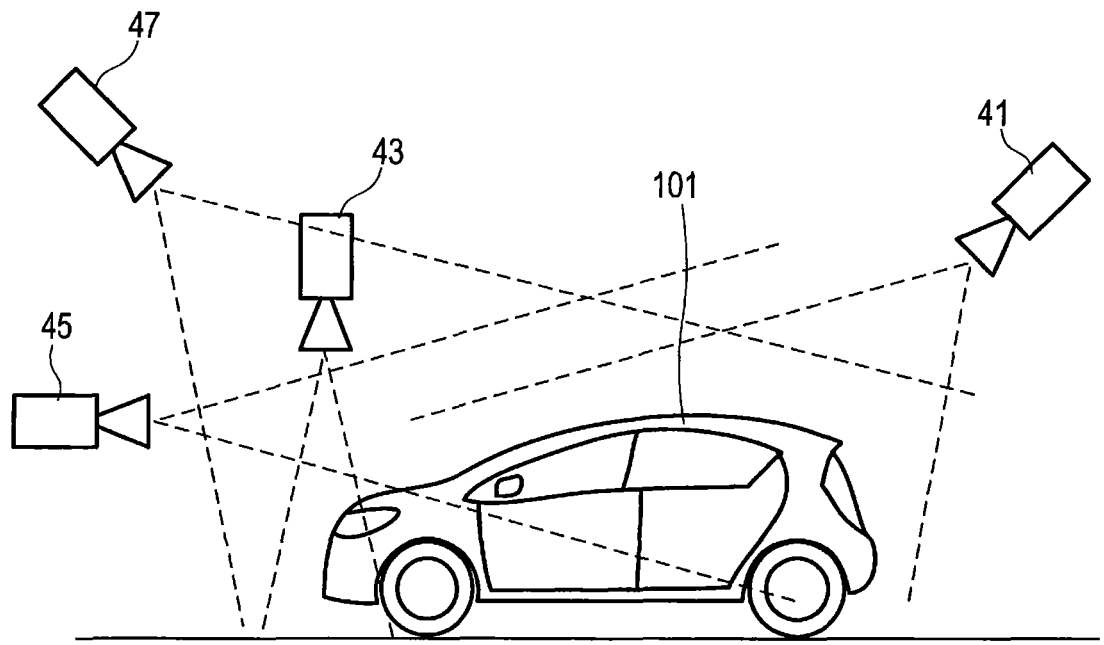
FIG. 2 is a diagram illustrating positions of virtual viewpoints.

As illustrated in FIG. 2, the viewpoint for surrounding images generated by the image generating unit 27 is set at four positions in reference to a vehicle 101. A first virtual viewpoint 41 is a viewpoint at which the camera looks down obliquely forward on the vehicle 101, on which the image display system 1 is mounted, from behind the vehicle 101. A second virtual viewpoint 43 is a viewpoint at which the camera looks down on the vehicle 101 from above a front end of the vehicle 101. A third virtual viewpoint 45 is a viewpoint at which the camera looks toward the vehicle 101 from the front of the vehicle 101. A fourth virtual viewpoint 47 is a viewpoint at which the camera looks down obliquely backward on the vehicle 101 from the front and above the vehicle 101.

Figure 3:
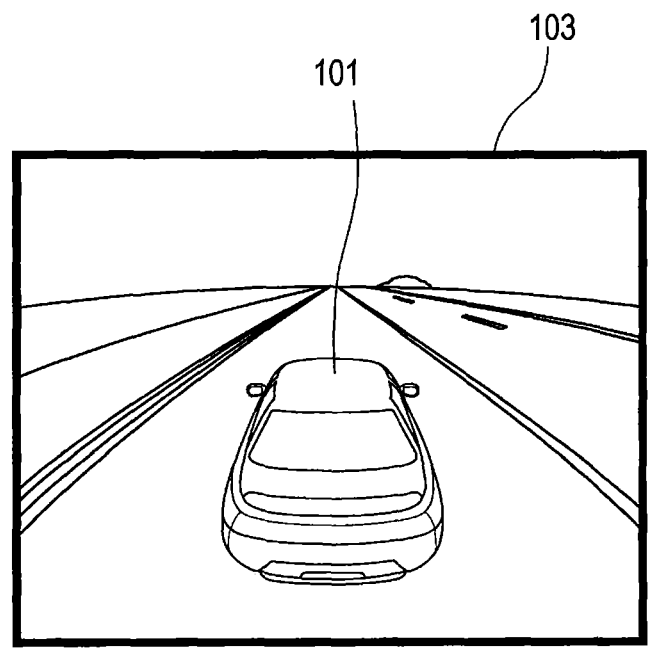
FIG. 3 is a diagram illustrating a rear-view image that is an example of a surrounding image.

FIG. 3 is a diagram illustrating a rear-view image 103, which is a surrounding image as viewed from the first virtual viewpoint 41. The rear-view image 103 is generated by synthesizing captured images from the four cameras 3a, 3b, 3c, 3d. No image of the vehicle 101 itself is captured by the camera 3, and thus, previously prepared images for the vehicle 101 are used for the synthesis. This also applies to images described below.

The rear-view image 103 allows a driver in the vehicle 101 to widely view the front of the vehicle 101 and enables easy understanding of a positional relationship between the vehicle 101 and, for example, obstacles shown in a captured image. That is, the rear-view image 103 is an image suitable for checking relatively wide range of surroundings focused on the front of the vehicle in a case where the vehicle is stopped, operation of the vehicle is started or the vehicle is parked, for example.

Figure 4:
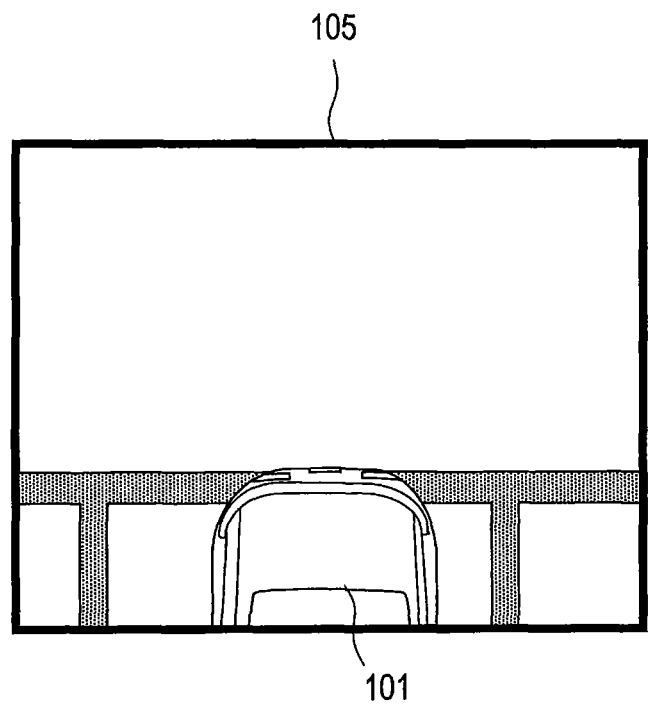
FIG. 4 is a diagram illustrating an upper-view image that is an example of a surrounding image.

FIG. 4 is a diagram illustrating an upper-view image 105, which is a surrounding image as viewed from the second virtual viewpoint 43. The upper-view image 105 is generated by converting the viewpoint for a captured image from the front camera 3a. The upper-view image 105 displays an area corresponding to a road surface in front of the vehicle 101 which is an area that includes a blind sport to the driver.

The upper-view image 105 allows the driver to acquire information on the surroundings of the front end of the vehicle 101. That is, the upper-view image 105 is an image suitable for a case where the vehicle starts moving forward or a case where the vehicle is traveling slowly to avoid a possible contact with an obstacle.

Figure 5:
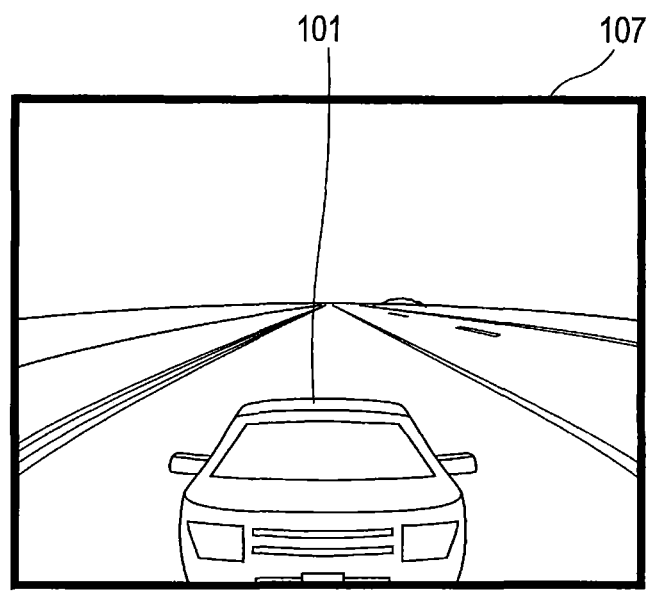
FIG. 5 is a diagram illustrating a front view image that is an example of a surrounding image.

FIG. 5 is a diagram illustrating a front view image 107, which is a surrounding image as viewed from the third virtual viewpoint 45. The front view image 107 is generated by synthesizing captured images from the rear camera 3b, a left camera 3c, and a right camera 3d.

The front view image 107 allows the driver to view an image appearing like a combination of display on a rearview mirror and display on side mirrors and displaying areas located laterally to and behind the vehicle, thus enabling an easy check for another vehicle located laterally to or behind the vehicle 101. That is, the front view image 107 is an image suitable, for example, for a case where the vehicle is making a lane change.

Figure 6:
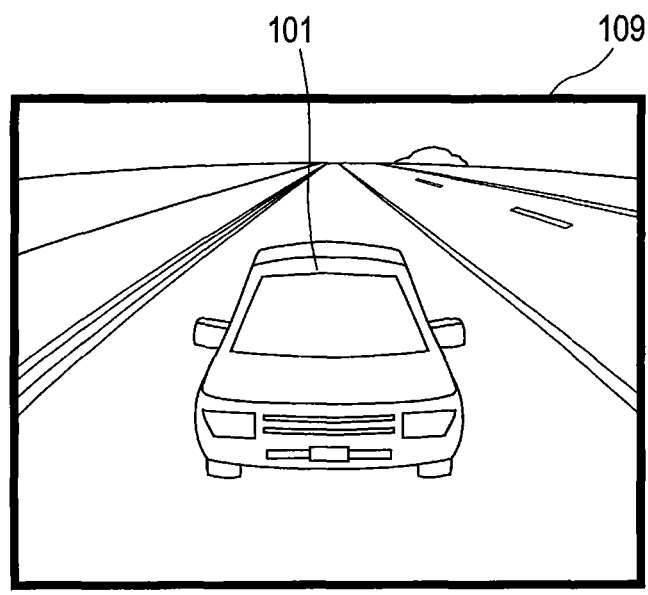
FIG. 6 is a diagram illustrating a front bird's-eye-view image that is an example of a surrounding image.

FIG. 6 is a diagram illustrating a front bird's-eye-view image 109, which is a surrounding image as viewed from the fourth virtual viewpoint 47. The front bird's-eye-view image 109 is generated by synthesizing captured images from the four cameras 3a, 3b, 3c, 3d.

The front bird's-eye-view image 109 allows the driver to widely view the surroundings focused on the back of the vehicle 101 and enables easy understanding of a positional relationship between the vehicle 101 and, for example, an obstacle and white lines on the road surface. That is, the front bird's-eye-view image 109 is a preferable image in a case where the vehicle is moving backward which requires confirmation of an obstacle or a parking frame, for example.

[1-3. Processing]

Next, image display processing executed by the CPU 21 of the ECU 7 will be described using a flowchart in FIG. 7. The present processing is repeatedly executed during the time an accessory switch of the own vehicle is on.

First, in S1, the CPU 21 determines whether the P range or the N range is set as the shift range using the selector 31. If the CPU 21 determines in S1 that the P range or the N range is set as the shift range, the processing proceeds to S2. On the other hand, if it is determined that the P range or the N range is not set as the shift range, the processing proceeds to S3.

In S2, the CPU 21 sets the virtual viewpoint behind the vehicle. In other words, when the vehicle is stopped, the rear-view image 103, in which the virtual viewpoint is located behind the vehicle, is displayed on the display apparatus 5 as the surrounding image. Subsequently, the present processing is ended.

Note that after the virtual viewpoint is set, the rear-view image 103 remains displayed until the setting is changed to another virtual viewpoint. The rear-view image 103, displayed on the display apparatus 5, is updated based on a newly captured image captured by the camera 3. That is, the display apparatus 5 displays a moving image showing the current situation as viewed from the virtual viewpoint behind the vehicle. This also applies to cases where a different virtual viewpoint is set in S5, S6, and S7 described below.

In S3, the CPU 21 determines whether the D range is set as the shift range. If the CPU 21 determines in S3 that the D range is set as the shift range, the processing proceeds to S4. On the other hand, if it is determined that the D range is not set not as the shift range, in other words, if it is determined that the R range is set as the shift range, the processing proceeds to S7.

In S4, the CPU 21 determines whether a vehicle speed is equal to or lower than a predetermined constant value. The vehicle speed equal to or lower than the constant value is, for example, 15 km/h to 0 km/h. If the vehicle speed is determined in S4 to be equal to or lower than the constant value, the processing proceeds to S5. On the other hand, if the vehicle speed is determined not to be equal to or lower than the constant value, that is, if the vehicle speed is determined to exceed the constant value, the processing proceeds to S6. The vehicle speed of the constant value corresponds to a predetermined speed.

In S5, the CPU 21 sets the virtual viewpoint above the front end of the vehicle. In other words, when the vehicle is moving forward slowly, the above-described upper-view image 105, in which the virtual viewpoint is located above the front end of the vehicle, is displayed on the display apparatus 5 as the surrounding image. Subsequently, the present processing is ended.

In S6, the CPU 21 sets the virtual viewpoint in front of the vehicle. In other words, when the vehicle is moving forward fast, the above-described front view image 107, in which the virtual viewpoint is in front of the vehicle, is displayed on the display apparatus 5 as the surrounding image. Subsequently, the present processing is ended.

In S7, the CPU 21 sets the virtual viewpoint above the front of the vehicle. In other words, when the vehicle is moving backward, the above-described front bird's-eye-view image 109, in which the virtual viewpoint is above and front of the vehicle, is displayed on the display apparatus 5 as the surrounding image. Subsequently, the present processing is ended.

[1-4. Effects]

According to the embodiment described above in detail, effects described below can be obtained.

(1a) In the image display system 1 according to the present embodiment, the display apparatus 5 displays the surrounding image showing the range suitable for the traveling status of the vehicle based on the shift range set by operating the selector 31 and the traveling speed of the vehicle. Therefore, the driver in the vehicle can view the appropriate image corresponding to the situation.

(1b) The above-described surrounding images are images from viewpoints different from those of the respective cameras 3. Thus, not only is an image selected from the captured images from the respective cameras 3 displayed but the image can be displayed in such a manner as to facilitate the driver's confirmation on the image.

(1c) The above-described surrounding image includes the image generated by synthesizing the images captured by the respective cameras 3. Compared to a captured image from one camera, such a surrounding image enables a wide range to be viewed, allowing a large amount of information to be provided to the driver by way of one surrounding image.

(1d) In the present embodiment, surrounding images of different viewpoints are displayed on the display apparatus 5 between the case where the P range or the N range is set as the shift range, and the case where the D range or the R range is set as the shift range. Thus, the driver can recognize, by way of the surrounding image, whether the driving force from the engine is transmitted to tires.

Furthermore, in the present embodiment, surrounding images of different viewpoints are displayed on the display apparatus 5 between the case where the R range is set as the shift range, and the case where a range other than the R range is set as the shift range. This enables the driver to recognize that the vehicle is in the backward moving state.

2. Other Embodiments

The present disclosure has been described so far, however, the present disclosure is not limited to the above-described embodiment, and many variations may be made to the embodiment.

(2a) In the configuration described in the above-described embodiment, the control status of the transmission 33 is determined based on the operation of the selector 31 by the driver in the vehicle. However, the determination may be made using another configuration. For example, the control status may be determined by receiving a signal indicative of the status of the transmission from a control apparatus controlling the transmission. If the transmission provided in the vehicle is of a manual type, the control status may be determined based on positions of a shift lever.

Furthermore, in a vehicle with automatic operation control in which some or all of the operations of the vehicle are performed by an automatic operation control apparatus instead of the driver, the control status of the transmission may be determined based on a signal outputted from the automatic operation control apparatus and indicating the control status of the transmission.

The control status of the transmission may be classified based on the gear ratio then.

(2b) In the configuration illustrated in the above-described embodiment, the status determining unit 25 determines the status of the transmission, which is an output control apparatus controlling the output direction of the driving force for the vehicle including the engine as a traveling driving source. However, the traveling driving source and the output control apparatus are not limited to those in the configuration of the above-described embodiment. For example, a motor may be used as the traveling driving source.

If the traveling driving source is a motor, a motor control apparatus controlling the rotating direction of the motor corresponds to the output control apparatus. The status determining unit 25 may determine the status of the motor control apparatus based on a signal outputted from the motor control apparatus or on the operating position of the selector. As a matter of course, even when the traveling driving source is a motor, if the vehicle includes a transmission, the status determining unit 25 may be configured to determine the status of the transmission.

(2c) In the configuration illustrated in the above-described embodiment, the four cameras are mounted on the vehicle. However, the number of the cameras is not particularly limited. Five or more cameras or three or less cameras may be provided.

(2d) In the configuration described in the above-described embodiment, the surrounding images from the different viewpoints are displayed according to the control status of the transmission and the traveling speed. However, images with different display ranges instead of the different viewpoints may be displayed. For example, when the P range is set as the shift range, a bird's-eye-view image may be displayed in which the camera looks down on the vehicle from immediately above the vehicle. On the other hand, if the D range is set as the shift range and the traveling speed is equal to or lower than the constant value, a portion of the bird's-eye-view image corresponding to the surroundings of the front end of the vehicle may be displayed in an enlarged form.

(2e) In the configuration described in the above-described embodiment, images from viewpoints different from those of the respective cameras 3 are generated and then displayed on the display apparatus 5 as the surrounding images. However, at least one surrounding image may be based on the same view as that of any one of the cameras 3. The surrounding image may be the image as it is captured by the camera 3 or an image generated by executing image processing on the captured image.

(2f) In the configuration illustrated in the above-described embodiment, the surrounding image varies according to the speed only if the D range is set as the shift range. However, the surrounding image may also vary according to the speed if the R range is set as the shift range. For example, when the selector is set to the R range, the rear-view image 103 may be displayed if the speed is 3 km/h or less, whereas the front bird's-eye-view image 109 may be displayed if the speed exceeds 3 km/h.

Furthermore, if a range other than the D range is present as a shift range for forward movement, surrounding images corresponding to the respective ranges and traveling speeds may be displayed.

Alternatively, surrounding images corresponding to the gear ratios set for the transmission and the traveling speeds may be displayed.

Further, the displayed surrounding images may be varied depending on whether the P range or the N range is set as the shift range.

(2g) The types of surrounding images are not limited to those illustrated in the above-described embodiment. Furthermore, five or more types of surrounding images may be used. For example, the displayed surrounding image may be varied in a step-by-step manner according to the traveling speed and may have a varying viewpoint or display range.

Furthermore, if the displayed surrounding image is switched according to the operation of the selector or a change in speed, the viewpoint for the image displayed on the display apparatus 5 may be gradually varied by displaying one or more images from viewpoints located between a viewpoint before switching and a viewpoint after the switching.

(2h) The display apparatus 5 may be configured to simultaneously display a plurality of surrounding images or to simultaneously display one or more surrounding images and any other image.

(2i) The functions of one component in each of the above-described embodiments may be assigned to a plurality of components, or the functions of a plurality of components may be fulfilled by one component. Alternatively, a plurality of functions of a plurality of components may be implemented by one component, or one function implemented by a plurality of components may be achieved by one component. Furthermore, the configuration of each of the above-described embodiments may be partly omitted. Additionally, at least part of the configuration of the above embodiment may be added to or replaced with another configuration of the above embodiment. All aspects encompassed by the technical ides, which are specified by only the wordings recited in the claims, should be an embodiment of the present invention.

(2j) The present disclosure may be implemented in various forms such as, in addition to the ECU 7, including the above-described image processing unit 19, the image display system 1, including the ECU 7 as a component, a program causing a computer to function as the image processing unit 19, a non-transitory tangible recording medium such as a semiconductor memory in which the program is recorded, and an image display method.

The invention claimed is:

1. An information processing apparatus comprising:
a status determining unit configured to determine a control status of control performed by an output control apparatus controlling an output direction of a driving force for a vehicle;
a speed detecting unit configured to detect a traveling speed of the vehicle; and
a display controlling unit configured to allow a display apparatus to display one or more surrounding images included in a plurality of surrounding images, the plurality of surrounding images being images which show surroundings of the vehicle based on images captured by one or more cameras capturing images of the surroundings of the vehicle and which differ from one another in at least one of a viewpoint and a display range; wherein
the display controlling unit is configured to allow the display apparatus to
display a surrounding image displaying an area visually recognized when looking downward from a viewpoint above a front end of the vehicle when the traveling speed detected by the speed detecting unit is equal to or lower than a predetermined speed, and to
display a surrounding image displaying areas located laterally to and behind the vehicle when the traveling speed detected by the speed detecting unit exceeds the predetermined speed, in a case where the control status determined by the status determining unit indicates that a driving force is allowed to be transmitted in such a manner as to move the vehicle forward.

2. The information processing apparatus according to claim 1, wherein
the status determining unit is configured to determine the control status based on a shift range selected by using a selector provided in the vehicle.

3. The information processing apparatus according to claim 1, further comprising:
an image generating unit configured to generate one or more images differing from the captured images in at least one of the viewpoint and the display range based on images captured by the one or more cameras, wherein
the plurality of surrounding images include the images generated by the image generating unit.

4. The image processing apparatus according to claim 1, wherein
the display controlling unit is configured to allow the display apparatus to display surrounding images of different viewpoints between a case where the control status determined by the status determining unit indicates that the driving force is not allowed to be transmitted and a case where the control status determined by the status determining unit indicates that the driving force is allowed to be transmitted in such a manner as to move the vehicle forward or backward.

5. The information processing apparatus according to claim 1, wherein the display controlling unit is configured to allow the display apparatus to display surrounding images of different viewpoints between a case where the control status determined by the status determining unit indicates a state that motive power is allowed to be transmitted to move the vehicle backward and a case where the control status determined by the status determining unit indicates other states.

6. An information processing apparatus comprising:

a status determining unit configured to determine a control status of control performed by an output control apparatus controlling an output direction of a driving force for a vehicle;

a speed detecting unit configured to detect a traveling speed of the vehicle; and a display controlling unit configured to allow a display apparatus to display one or more surrounding images included in a plurality of surrounding images, the plurality of surrounding images being images which show surroundings of the vehicle based on images captured by one or more cameras capturing images of the surroundings of the vehicle and which differ from one another in at least one of a viewpoint and a display range; wherein the display controlling unit is configured to allow the display apparatus to display a surrounding image displaying an area corresponding to a road surface in front of the vehicle which is a blind spot of a driver of the vehicle when the traveling speed detected by the speed detecting unit is equal to or lower than a predetermined speed, and to display a surrounding image displaying areas located laterally to and behind the vehicle when the traveling speed detected by the speed detecting unit exceeds the predetermined speed, in a case where the control status determined by the status determining unit indicates that a driving force is allowed to be transmitted in such a manner as to move the vehicle forward.

7. The information processing apparatus according to claim 6, wherein the status determining unit is configured to determine the control status based on a shift range selected by using a selector provided in the vehicle.

8. The information processing apparatus according to claim 6, further comprising:

an image generating unit configured to generate one or more images differing from the captured images in at least one of the viewpoint and the display range based on images captured by the one or more cameras, wherein the plurality of surrounding images include the images generated by the image generating unit.

9. The information processing apparatus according to claim 6, wherein the display controlling unit is configured to allow the display apparatus to display surrounding images of different viewpoints between a case where the control status determined by the status determining unit indicates that the driving force is not allowed to be transmitted and a case where the control status determined by the status determining unit indicates that the driving force is allowed to be transmitted in such a manner as to move the vehicle forward or backward.

10. The information processing apparatus according to claim 6, wherein the display controlling unit is configured to allow the display apparatus to display surrounding images of different viewpoints between a case where the control status determined by the status determining unit indicates a state that motive power is allowed to be transmitted to move the vehicle backward and a case where the control status determined by the status determining unit indicates other states.

11. A non-transitory computer-readable storage medium storing instructions for causing a computer to function as:

a status determining unit configured to determine a control status of control performed by an output control apparatus controlling an output direction of a driving force for a vehicle;

a speed detecting unit configured to detect a traveling speed of the vehicle; and a display controlling unit configured to allow a display apparatus to display one or more surrounding images included in a plurality of surrounding images, the plurality of surrounding images being images which show surroundings of the vehicle based on images captured by one or more cameras capturing images of the surroundings of the vehicle and which differ from one another in at least one of a viewpoint and a display range; wherein the display controlling unit is configured to allow the display apparatus to display a surrounding image displaying an area visually recognized when looking downward from a viewpoint above a front end of the vehicle when the traveling speed detected by the speed detecting unit is equal to or lower than a predetermined speed, and to display a surrounding image displaying areas located laterally to and behind the vehicle when the traveling speed detected by the speed detecting unit exceeds the predetermined speed, in a case where the control status determined by the status determining unit indicates that a driving force is allowed to be transmitted in such a manner as to move the vehicle forward.

12. A non-transitory computer-readable storage medium storing instructions for causing a computer to function as:

a status determining unit configured to determine a control status of control performed by an output control apparatus controlling an output direction of a driving force for a vehicle;

a speed detecting unit configured to detect a traveling speed of the vehicle; and a display controlling unit configured to allow a display apparatus to display one or more surrounding images included in a plurality of surrounding images, the plurality of surrounding images being images which show surroundings of the vehicle based on images captured by one or more cameras capturing images of the surroundings of the vehicle and which differ from one another in at least one of a viewpoint and a display range; wherein the display controlling unit is configured to allow the display apparatus to display a surrounding image displaying an area corresponding to a road surface in front of the vehicle which is a blind spot of a driver of the vehicle when the traveling speed detected by the speed detecting unit is equal to or lower than a predetermined speed, and to display a surrounding image displaying areas located laterally to and behind the vehicle when the traveling speed detected by the speed detecting unit exceeds the predetermined speed, in a case where the control status determined by the status determining unit indicates that a driving force is allowed to be transmitted in such a manner as to move the vehicle forward.

* * * * *